Figures 1, 2:
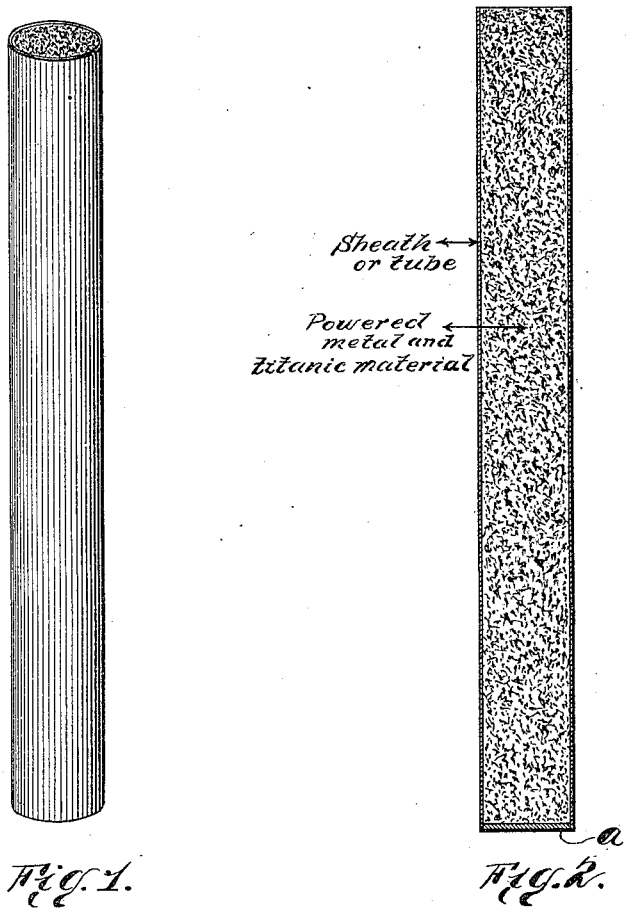

I. LADOFF.
ARC LIGHT ELECTRODE OR PENCIL.
APPLICATION FILED FEB. 12, 1908.

1,022,426.

Patented Apr. 9, 1912.

Sheath or tube

Powered metal and titanic material

Witnesses:
C. A. Jarvis
Philip O. Peck

Inventor:
Isador Ladoff
by Walter D. Edmonds
his Attorney.

UNITED STATES PATENT OFFICE.

ISADOR LADOFF, OF CLEVELAND, OHIO, ASSIGNOR OF THIRTY ONE-HUNDREDTHS TO PHILIP C. PECK, OF NEW YORK, N. Y.

ARC-LIGHT ELECTRODE OR PENCIL.

1,022,426.

Specification of Letters Patent.

Patented Apr. 9, 1912.

Application filed February 12, 1908. Serial No. 415,490.

*To all whom it may concern:*

Be it known that I, ISADOR LADOFF, a citizen of the United States, and a resident of the city of Cleveland, county of Cuyahoga, and State of Ohio, have invented certain new and useful Improvements in Arc-Light Electrodes or Pencils, of which the following is a specification, reference being had to the accompanying drawings, in which—

Figure 1 is an elevation of one of my improved pencils, and Fig. 2 a central longitudinal section of Fig. 1.

My present invention relates to electrodes or pencils used in the production of the arc light, and its objects comprise facilitation and economy of construction under certain conditions, steadying of the arc, longevity of the pencil, etc.

I attain these objects by my novel construction, which is as follows:—Into a container or sheath, preferably of tubular form as shown, and possessing preferably good electrical conductivity, as for instance iron, I pack powdered materials, to wit, a proportion of titanic material, as for instance titanium oxid, $TiO_2$ 30%, and a proportion of powdered metal having higher electrical conductivity than said titanic material, as for instance iron 70%. The bottom of the tube is provided with a plug or stopper $a$ to retain the powdered contents. The tube is then filled with the latter, which is preferably tightly packed therein, care being taken to first mix the respective powdered ingredients as thoroughly and homogeneously as possible. The open end of the tube may then conveniently be closed by fusion in the arc of the powdered contents near the top, thus forming a cap adhering to the tube and sealing the powder beneath to prevent its loss during transportation.

My pencils are preferably burned as lowers which insures retention of the powdered contents during arcing. Instead of using powdered iron mixed with powdered oxid of titanium, a powdered alloy of iron and titanium, ferro-titanium, may be substituted with good results.

Letters Patent No. 840,634 were, on the 8th day of January 1907, granted to me for arc light electrodes containing ferro-titanium, and I have application now pending filed June 18th, 1904, Serial No. 213,065 for Letters Patent to cover an arc light pencil composed of a titanic material, as oxid of titanium, conglomerated with metal having greater electrical conductivity, as iron.

I am aware that arc light pencils have been heretofore made by filling metallic, including iron, tubes with powdered ingredients including titanic material and oxids of metals including oxid of iron, and I do not wish to be understood as claiming that my present invention embraces any such devices, an essential characteristic of my present invention being the use in such a tube of powdered titanic material intimately mixed with powdered metal in elemental state, which for many purposes, is, I have discovered, of advantage.

What I claim as new and desire to secure by Letters Patent is the following, viz:—

1. An arc light electrode comprising an iron tube containing a mixture consisting of powdered metallic iron and a powdered titanic substance.

2. An arc light electrode consisting of an iron tube containing a mixture consisting of powdered metallic iron and powdered oxid of titanium intimately and homogeneously mixed together.

ISADOR LADOFF.

Witnesses:
PHILIP C. PECK,
GEO. G. MEASURES.